F. SCHIMMEL.
FRICTIONAL SHOCK ABSORBER.
APPLICATION FILED OCT. 30, 1911.

1,097,050.

Patented May 19, 1914.

Witnesses,
E. C. Skinkle
A. H. Opsahl

Inventor:
Fridolin Schimmel
By his Attorneys;

UNITED STATES PATENT OFFICE.

FRIDOLIN SCHIMMEL, OF FARIBAULT, MINNESOTA.

FRICTIONAL SHOCK-ABSORBER.

1,097,050.

Specification of Letters Patent. Patented May 19, 1914.

Application filed October 30, 1911. Serial No. 657,663.

*To all whom it may concern:*

Be it known that I, FRIDOLIN SCHIMMEL, a citizen of the United States, residing at Faribault, in the county of Rice and State of Minnesota, have invented certain new and useful Improvements in Frictional Shock-Absorbers; and I do hereby declare the following to be a full, clear, and exact description of the invention, such as will enable others skilled in the art to which it appertains to make and use the same.

My invention has for its object to provide an extremely simple and highly efficient frictional shock absorber for automobiles and other vehicles. And to such ends, generally stated, the invention consists of the novel devices and combinations of devices hereinafter described and defined in the claims.

In the accompanying drawings, which illustrate the invention, like characters indicate like parts throughout the several views.

Figure 1:
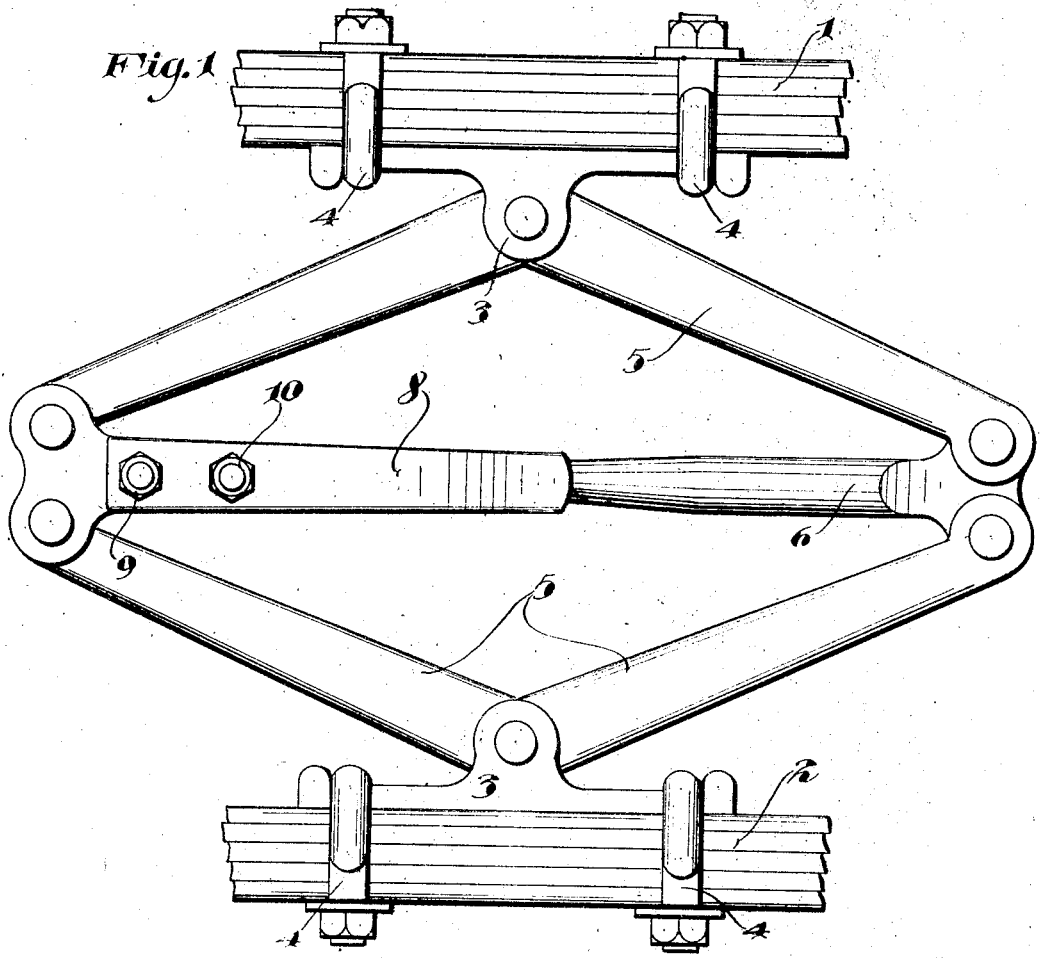
Figure 2:
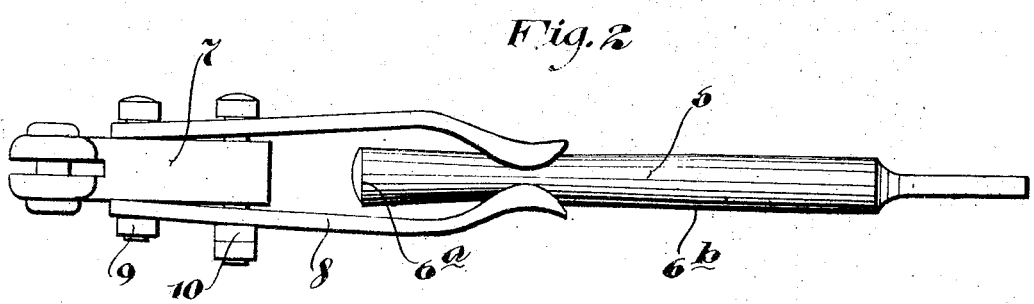

Referring to the drawings: Figure 1 is a view in side elevation showing the improved shock absorber; and Fig. 2 is a plan view of certain of the parts shown in Fig. 1.

The numerals 1 and 2 indicate respectively the upper and lower portions of a double elliptical spring, portions of which are broken away. From a broad point of view, the parts 1 and 2 are spring connected members movable one in respect to the other. As applied to an automobile, they yieldingly support the body from the running gear, preferably in the usual way. To the central portions of the spring members 1 and 2, brackets 3 are rigidly secured, preferably by ordinary nut equipped yokes 4.

The numeral 5 indicates a pair of toggle levers one of which is inverted in respect to the other, and the intermediate joints of which are pivotally connected, one to the upper and the other to the lower bracket 3. The outer ends of the toggles 5 are pivotally connected at one side to the outer end of a friction bar or plunger 6, and, at the other end, to a head block 7. A pair of heavy leaf springs 8 are connected to the head block 7, by a pair of nut equipped bolts 9 and 10. The free ends of these springs 8 are made spoon-shaped so that they embrace and maintain engagement with the friction bar 6, the latter being preferably made round in cross section. The tension of the springs 8 on the bar 6 may be varied by adjustments of the nut on the bolt 10. Between the points marked 6ª and 6ᵇ, the friction bar or plunger 6 is gradually reduced in diameter to an intermediate point.

Under normal load and under normal conditions, the ends of the springs 8 are engaged with the smallest diameter of the bar section 6ª and 6ᵇ and hence will have a comparatively light frictional engagement with the said bar 6. Hence, when running on smooth roads, the friction device will offer very slight resistance to those vibratory movements which are imparted to the vehicle body. This is just what is desired because the springs properly carry the vehicle body on smooth roads. In running over rough roads, or when the vehicle body is given considerable vibration, the movements of the springs will be retarded by the friction device and sudden jars and movements which would otherwise be produced by recoil of the springs is prevented.

It is important to note that the toggles 5 always form obtuse angles, or, otherwise stated, the members of the toggles are always at an acute angle to the frictional resistance device made up of the bar 6, friction springs 8, and head 7. Hence, it follows that the movement of the friction bar 6 in respect to the friction springs 8 will be very much less than the movement of the spring members 1 and 2 in respect to each other. This relatively short movement in a device of this kind, wherein there is more or less play between the joints of the toggles, causes the friction device to remain inactive, or approximately so, under those slight movements which are given to the vehicle body when running on smooth roads. Thus, the elasticity of the vehicle springs is maintained under ordinary conditions and the friction device is rendered operative to absorb or prevent shocks or violent movements that would otherwise be transmitted to the vehicle body when running on rough roads.

What I claim is:—

1. The combination with relatively movable spring connected members, of a pair of reversely buckled toggles having their intermediate joints connected to said members, a friction bar connected to one extremity of said toggles, and a pair of opposing members connected to the other extremity of said toggles and frictionally engaging said bar.

2. The combination with the upper and lower portions of an elliptical spring, of a pair of reversely buckled toggles having their intermediate joints pivotally connected to said upper and lower portions of said spring, a friction bar pivotally connected at one end to one extremity of said toggles, a head block pivotally connected to the other extremity of said toggles, and a pair of clamping springs or members applied to said head block and frictionally engaging said friction bar.

In testimony whereof I affix my signature in presence of two witnesses.

FRIDOLIN SCHIMMEL.

Witnesses:
JAS. P. McMAHON,
HENRY SCHLATTER.